United States Patent Office 3,642,917
Patented Feb. 15, 1972

3,642,917
VINYL FLUORIDE FROM 1-FLUORO-2-CHLORO-ETHANE BY PYROLYSIS IN THE PRESENCE OF ETHYLENE
Joseph Warren Hamersma, Tustin, Calif., assignor to Atlantic Richfield Company, New York, N.Y.
No Drawing. Continuation-in-part of application Ser. No. 844,199, July 23, 1969. This application July 27, 1970, Ser. No. 58,670
Int. Cl. C07c *17/34, 21/18*
U.S. Cl. 260—653.5
7 Claims

ABSTRACT OF THE DISCLOSURE 1-fluoro-2-chloroethane is pyrolized in the presence of ethylene dichloride to vinyl fluoride. The pyrolysis occurs at 400° C. to 800° C. in ethylene dichloride to 1-fluoro-2-chloroethane ratios of 1:10 to 5:1.

CROSS REFERENCES TO RELATED APPLICATION

This application is a continuation-in-part of my co-pending application Ser. No. 844,199 filed July 23, 1969 and now abandoned.

BACKGROUND OF THE INVENTION

This invention relates to the pyrolysis of 1-fluoro-2-chloroethane to produce vinyl fluoride. More particularly, this invention relates to a novel process for preparing vinyl fluoride by pyrolysis of 1-fluoro-2-chloroethane in the presence of ethylene dichloride.

DESCRIPTION OF THE PRIOR ART

Vinyl fluoride is a known and valuable monomer for producing plastics useful in many applications. See, for example, V. L. Simirill and B. A. Currie, Journal of Applied Polymer Science, vol. IV, 62–68 (1960) and Chemical Engineering, vol. 71, pp. 90–91 (1964). Several copolymers of vinyl fluoride have been described, see for example, Journal of American Chemical Society, vol. 86, pp. 460–63 (1964), Chemistry and Industry, Nov. 27, 1965, p. 1976 and Journal of Polymer Science, A–3, p. 4263 (1965).

Vinyl fluoride has been produced by a variety of processes including the thermal dehydrochlorination of 1-chloro-1-fluoroethane, U.S. Pats. 3,200,160 and 3,414,627, passing a gaseous mixture of HF and acetylene over a cadmium containing catalyst, Pat. No. 3,413,361. Thomas, Pat. No. 2,673,884 describes a process for preparing 1-fluoro-2-chloroethane and refers to the dehydrohalogenation of this compound to vinyl fluoride over lime, soda lime, limestone, etc. Vinyl chloride is conventionally produced by pyrolysis of 1,2-dichloroethane, see, e.g., Chemical Engineering, Apr. 10, 1967, pp. 219–26.

Conventional pyrolysis concepts, when applied to the production of vinyl fluoride from 1-fluoro-2-chloroethane was successful but the yields and specificity to the desired fluorine containing unsaturated monomeric compound, vinyl fluoride, was low. I have now provided a process for producing vinyl fluoride in improved yield and with unexpectedly high specificity.

SUMMARY OF THE INVENTION

According to the present inventon, 1-fluoro-2-chloroethane is pyrolyzed in the presence of ethylene dichloride to produce the analogous fluorine containing monomer with high specificity. Pyrolysis temperatures may be from about 400° C. to about 800° C. and residence times may be from about 0.01 second to about 100 seconds. The ratio of ethylene dichloride to the unsaturated fluorine containing compound may be from about 1:10 to about 5:1.

It is, accordingly, an object of this invention to provide an improved process for producing unsaturated fluorine containing monomers by the pyrolysis of fluorine containing saturated compounds.

A still more specific object of the invention is to provide an improved process for producing vinyl fluoride by the pyrolysis of 1-fluoro-2-chloroethane in the presence of ethylene dichloride.

The specific pyrolysis conditions constitute additional more specific non-limiting objects of the invention.

Other objects of the invention will be apparent from the specification.

DESCRIPTION OF THE PREFERRED EMBODIMENTS

According to the present invention useful fluorine containing monomers are produced by the pyrolysis of 1-fluoro-2-chloroethane in the presence of ethylene dichloride to increase the yield of the fluorine containing monomer and significantly to improve the specificity to the desired fluorine containing monomer. Precursors of the indicated formula may be prepared by a variety of methods. One highly efficient method is described by Caserio and Hamersma, Chlorofluorination of Olefins, patent application Ser. No. 844,118, filed concurrently with the parent of application Ser. No. 844,199.

Vinyl fluoride is a compound of the class described which is of particular interest. Accordingly, the process will be described, for convenience, in terms of the pyrolysis of 1-fluoro-2-chloroethane in the presence of ethylene dichloride to produce vinyl fluoride.

The process of this invention is preferably carried out in a hot tube reactor, which may be of the type described in U.S. Pat. No. 2,724,006, using the general principles referred to by Albright, Chemical Engineering, Apr. 10, 1967, pp. 219–226.

The reaction may be carried out successfully in the temperature range of about 400° C. to about 800° C. The preferred temperature range, however, is from about 450° C. to about 600° C. and a more preferred range is from about 500° C. to about 600° C. with best yields and selectivities resulting from operation above 525° C. and up to roughly 575° C. Optimum temperature is somewhat dependent upon reactor design and upon the ratio of, e.g., ethylene dichloride (EDC) to ethylene fluorochloride (EFC). Generally, less EDC is required to provide optimum conversion and specificity at higher temperatures.

Residence or contact time in the reactor is also somewhat dependent upon EDC–EFC ratios and is dependent upon reactor temperature. At temperatures approaching 600° C., the residence time for optimum conversion and specificity is generally in the range of about 1 to 4 seconds. In the temperature range of 500–550° C., however, residence times of 5–8 or 10 seconds give optimum conversion and specificity. Longer residence times are desirable with low EDC–EFC ratios. While these are optimum residence or contact times, under the conditions in which this invention has been practiced in the laboratory, the process may be carried out with residence times greatly above and below these figures. For example, residence times from 0.01 to about 100 seconds may be used, although the commercially feasible range of residence times is believed to be in the range of from about 0.1 second to about 10 seconds.

The essential novelty of the inventive process resides in the use of a mixture of ethylene dichloride with the fluorochloroalkane which is to be cracked. This mixture, i.e., the addition of ethylene dichloride to the fluorine containing compound, results in improved yield and in a highly unexpected improvement in specificity of the reaction to the fluorine containing unsaturated monomer, vinyl fluoride. Since the vinyl fluoride monomer is several times more valuable than the vinyl chloride monomer, which can be produced cheaply by several processes, the importance of a reaction which is highly selective to the dehydrochlorination, rather than dehydrofluorination, will be readily apparent.

The ethylene dichloride-fluorochloroalkane ratio (EDC–EFC ratio) may be from about 1:10 to about 5:1. The EDC–EFC ratio of 1:5 to 3:1 is preferred and highly unexpected specificity to the fluorine containing compound has been obtained using EDC–EFC ratios of from about 1:2 to about 2:1. Optimum ratios, as previously indicated, depend upon the reactor design and temperature, which factors may be limited to some degree by ancillary considerations. Obviously, optimum EDC–EFC ratios should be determined with proper consideration for other reaction variables but will fall generally in the range of 1:10 to 5:1.

A suitable laboratory apparatus for carrying out the reaction of this invention is described as follows. The reactor is suitably a tube surrounded by a heater with appropriate temperature control devices. Means are provided to the inlet of the tubular reactor for injecting helium, as a carrier, at any desired rate, such as from 0.01 to 100 volumes per reactor volume. EFC, or a homologous fluorochloroalkane, is injected into the helium stream by a motor driven syringe. Ethylene dichloride may be injected separately into the helium stream, as by a motor driven syringe, but for experimental simplicity and for reasons discussed in greater detail hereinafter, the ethylene dichloride is preferably premixed with the fluorochloroalkane and injected therewith.

The tubular reactor may be packed, with catalytic or non-catalytic material, or used in the unpacked condition. Effluent from the reactor is passed through an ice trap to recover unreacted starting material, then through a trap for HCl, such as a KaOH trap, to a liquid nitrogen trap for recovery of the unsaturated monomeric material. Separation of the reactant materials may be by fractionation or other conventional chemical separation technique.

During initial investigations, several catalysts at varying temperatures were screened. The catalyst materials screened included calcium oxide, Pyrex wool, Pyrex beads, Alundum, silica gel and gamma alumina. It became apparent that, with the exception of gamma alumina, the catalyst had a neutral or slightly negative effect on the selectivity of the reaction to vinyl fluoride. It was noticed that the selectivities tended toward a maximum of 85 percent and were highest when the conversions and/or temperatures were the highest. From the results obtained in the early experiments it was concluded that the reaction was pyrolytic rather than catalytic dehydrohalogenation.

Several very careful experiments were run using glass beads in the reactor tube to provide a hot contact surface for heat transfer. These experiments showed that in the temperature range of interest, from about 500 to about 550 or 560° C., using a residence time of 4–5 seconds, selectivity to vinyl fluoride was about 75 percent with conversions of about 3 percent. These results are summarized in the following table.

TABLE I.—PYROLYSIS OF CHLOROFLUOROETHANE

| Temperature | Selectivity to ViF | Percent conversion |
| --- | --- | --- |
| 507 | 72 | 3 |
| 517 | 75 | 3 |
| 527 | 72 | 3 |
| 540 | 72 | 3 |
| 555 | 72 | 3 |

In the process for producing 1-fluoro-2-chloroethane described by Caserio and Hamersma, supra, a mixture of ethylene dichloride and fluorochloroethane will be produced. A series of experiments were run, therefore, to determine if the fluorochloroethane pyrolysis reaction would occur in the presence of ethylene dichloride. Quite unexpectedly, ethylene dichloride, which would occur as an impurity in the preceding process, resulted in not only a significantly improved yield of the fluorine containing monomer but resulted in a dramatic increase in specificity of the reaction to the fluorine containing monomer, vinyl fluoride. In the temperature range of from 507–540° C., the selectivity increased from 85–100 percent and conversion changed to from 2 to 15 percent, clearly showing a synergistic effect on both conversion and selectivity for the mixture. Reaction rates were identical for both compounds. The results of these experiments, which were carried out under the same conditions as the experiments providing data for Table I, are summarized in Table II.

TABLE II.—PYROLYSIS OF CHLOROFLUOROETHANE-ETHYLENE DICHLORIDE MIXTURE

| Temperature | Selectivity to ViF | Percent conversion |
| --- | --- | --- |
| 507 | 85 | 2 |
| 517 | 84 | 5 |
| 526 | 101 | 9 |
| 540 | 106 | 15 |

The process of this invention, therefore, not only dispenses with the necessity or desirability of separating EDC from EFC prior to pyrolysis but gives an unexpectedly high synergistic improvement in yield and selectivity. The monomeric products from the reaction are easily separated by distillation for producing, respectively, vinyl chloride polymers and the more valuable vinyl fluoride polymers according to known polymerization processes.

This reaction appears to be limited to 1-fluoro-2-chloroethane since, under the same conditions, 1-chloro-2-fluoropropane simply eliminated hydrogenfluoride and did not give the fluorine containing monomer.

It has previously been indicated that the reaction may be carried out over catalytic materials; however, this reaction is pyrolytic and the presence of certain catalysts may be slightly detrimental. Acidic and basic catalysts, in particular, tend to be detrimental to the process of this invention. It may be desirable to include catalytic materials in the reactor for purposes other than conversion of EFC but, in general, the reaction is best carried out in unpacked tubes or in tubes packed with materials catalytically inert to the reaction of interest.

As the foregoing clearly indicates, a novel process for preparing unsaturated fluorine containing monomeric materials, vinyl fluoride in particular, with unexpectedly high yields and surprisingly synergistic effects upon specificity has been described. It is expected that one skilled in this art will be able to make certain modifications of the process variables based upon the foregong teachngs without departing from the spirit and scope of the claims which follow.

I claim:
1. In a process for producing halogen containing unsaturated monomeric compounds by the pyrolysis of 1-fluoro-2-chloroethane at temperatures of from about 400° C. to about 800° C., and residence times of from 0.01 to about 100 seconds, the improvement wherein said saturated compound is pyrolytically converted to vinyl fluoride in the presence of ethylene dichloride in the ratio of from about 1:10 to about 5:1 parts of ethylene dichloride per part 1-fluoro-2-chloroethane.

2. The process of claim 1 wherein the temperature is from about 450° C. to about 600° C.

3. The process of claim 2 wherein the residence time is from about 1 second to about 10 seconds.

4. The process of claim 1 wherein the residence time is from about 1 second to about 10 seconds.

5. The process of claim 1 wherein the ratio of ethylene dichloride to 1-fluoro-2-chloroethane is from about 1:5 to about 3:1.

6. The process of claim 5 wherein the temperature is from about 500° C. to about 600° C. and the residence time is from about 1 to about 10 seconds.

7. The process of claim 6 wherein the ratio of ethylene dichloride to 1-fluoro-2-chloroethane is from about 1:2 to about 2:1.

References Cited

UNITED STATES PATENTS 2,628,989   2/1953   Miller.
3,200,160   8/1965   Sianesi et al.

FOREIGN PATENTS 1,419,081   10/1965   France.

DANIEL D. HORWITZ, Primary Examiner